United States Patent
Mundilla Garcia et al.

(10) Patent No.: US 11,418,486 B2
(45) Date of Patent: Aug. 16, 2022

(54) METHOD AND SYSTEM FOR CONTROLLING INTERNET BROWSING USER SECURITY

(71) Applicant: TELEFONICA DIGITAL ESPAÑA, S.L.U., Madrid (ES)

(72) Inventors: Victor Manuel Mundilla Garcia, Madrid (ES); Aruna Prem Bianzino, Madrid (ES); Jose Maria Alonso Cebrian, Madrid (ES); Sergio De Los Santos Vilchez, Madrid (ES)

(73) Assignee: TELEFONICA CYBERSECURITY TECH S.L., Madrid (ES)

( * ) Notice: Subject to any disclaimer, the term of this patent is extended or adjusted under 35 U.S.C. 154(b) by 208 days.

(21) Appl. No.: 16/787,323

(22) Filed: Feb. 11, 2020

(65) Prior Publication Data

US 2020/0259791 A1    Aug. 13, 2020

(30) Foreign Application Priority Data

Feb. 12, 2019   (EP) ..................................... 19382098

(51) Int. Cl.
H04L 29/06 (2006.01)
H04L 9/40 (2022.01)

(52) U.S. Cl.
CPC ...... H04L 63/0245 (2013.01); H04L 63/1425 (2013.01)

(58) Field of Classification Search
CPC . H04L 63/0245; H04L 63/10; H04L 63/1425; H04W 12/08; H04W 12/67
See application file for complete search history.

(56) References Cited

U.S. PATENT DOCUMENTS 8,571,538 B2    10/2013  Sprigg et al.
10,305,911 B1*  5/2019   Eyre ..................... H04L 63/101
10,992,678 B1*  4/2021   Gilman ................. G06F 21/604
2013/0017806 A1  1/2013   Sprigg et al.
(Continued)

FOREIGN PATENT DOCUMENTS

WO    2011/094746 A2    8/2011

OTHER PUBLICATIONS

European Search Report for EP19382098.2 dated Jun. 18, 2019.

*Primary Examiner* — Joseph P Hirl
*Assistant Examiner* — Ka Shan Choy
(74) *Attorney, Agent, or Firm* — Sughrue Mion, PLLC

(57) ABSTRACT

A method and system for controlling internet browsing user security is provided. A control device (120) receives, via a first communication channel, a web page request from a control agent (102) implemented in a browser (101), the browser (101) being installed in a computer device operated by a user. Then, the control device (120) requests, to a control service (130), via a second communication channel, a security level of said requested web page including a status of the user and the presence of risks in the requested web page. The control service (130) executes a security check on said requested web page by checking whether the requested web page is included in a blacklist or a whitelist and also by checking certain risk control criteria of the requested web page. Finally, in response to receipt a result of said security check, the control device (120) allows or denies access to said web page.

12 Claims, 3 Drawing Sheets

(56) References Cited

U.S. PATENT DOCUMENTS

| | | | |
|---|---|---|---|
| 2014/0059683 A1* | 2/2014 | Ashley | H04L 63/1425 |
| | | | 726/23 |
| 2015/0347769 A1 | 12/2015 | Espinosa et al. | |
| 2015/0365379 A1 | 12/2015 | Wu et al. | |
| 2016/0014043 A1* | 1/2016 | Kong | H04L 67/42 |
| | | | 709/203 |
| 2016/0142372 A1* | 5/2016 | Hirvonen | H04L 63/0227 |
| | | | 726/12 |
| 2017/0353463 A1* | 12/2017 | Wu | G06F 21/6218 |
| 2018/0069867 A1* | 3/2018 | Grajek | H04W 12/062 |

* cited by examiner

METHOD AND SYSTEM FOR CONTROLLING INTERNET BROWSING USER SECURITY

TECHNICAL FIELD

This invention relates to a method, and corresponding system, for controlling Internet browsing user security, in real time.

BACKGROUND OF THE INVENTION

Nowadays Internet is offering a virtually unlimited access to information and entertainment. Most of the time, users access such information and entertainment through browsers, exposing to a huge variety of risks, ranging from security attacks, exposure of sensitive personal or enterprise data and resources, to time or coercion for some actions.

Users have a really low degree of awareness of the risks they face when browsing the Internet. At the same time, every kind of enforcement towards user awareness is often seen by the user as an inconvenience, and users tend towards always accepting any kind of notification/warning without reading it, to the point in which specific software has been designed to automatically avoid warning messages. Finally, users tend to do what they are instructed to do, even if they are not aware of the results, exposing hence to further risks.

In this context, different solutions are available to control the internet access of a user, generally aiming at Parental Control. The available solutions generally define static criteria to differentiate the content and operations available to a user (eventually on the basis of external databases), and generally offer a static decision on the request. In the cases in which a control user is involved, they are asked for a non-informed/non-supported decision.

Some patents and patent applications are known in the field.

US 2013017806 A1 discloses a system for controlling the internet access of a mobile device (parental control), allowing another mobile device (the controller) to set criteria for the user to navigate, including location and time of the day/week. Unlike present invention, this solution only aims at mobile devices as controlled devices. This solution only aims at parental control and not at the security of a generic user when browsing the internet. This solution is not interactive and does not allow a real-time control over the controlled devices and their activity.

U.S. Pat. No. 8,571,538 B2 provides a system to dynamically generate community based parental control for cell devices based on most common parental control settings selected by members of the community. The criteria for controlling the access of the controlled device may be based on different profiles, which are built on the basis of the average profiles of parental control presents in the community. The controller (parent) may select one of the available "community" criteria set, and edit it. The community criteria sets are constantly updated on the basis of the choices of the controllers part of the community. This solution only aims at mobile devices as controlled devices. This solution only aims at parental control and not at the security of a generic user when browsing the internet. This solution is not interactive and does not allow a real-time control over the controlled devices and their activity, even if it allows changes in the criteria setting by the controller.

US 2015365379 A1 provides a system for intelligently learning a list of allowed IP content at one or more internet connected devices by implementing an intelligent parental control means. The means includes a router and a filter. The filter is implemented in the router which connects the device to the internet. On the basis of a learning period, the system learns which the allowed contents to be browsed are. This generates a whitelist, which may be later modified by the controller through another device connected to the router. Unlike present invention, this solution only aims at parental control and not at the security of a generic user when browsing the internet. This solution is not interactive and does not allow a real-time control over the controlled devices and their activity, even if the controller receives alerts on real time if the controlled device is attempting to access a content denied by the policy. Still, the alert is based on the policy and not dynamically on the content, only allowing controlling known content and risks.

US 20150347769 A1 defines a hierarchy among users. The users in a lower hierarchical level must ask for permission to the users in a higher hierarchical level in order to access "restricted" internet content (or perform other restricted operations). The controller may ignore the request, or grant permission. This solution only envisions the case in which the different involved devices are used by different end users. The restrictions to perform operations for the controlled user are defined on the basis of the operation type (e.g., purchase, access a specific type of content, etc.), on a static base, and are not analyzed in real time.

New techniques/solutions are therefore needed for real-time security control of browsing working for both security control over another user as well as for self-security control.

DESCRIPTION OF THE INVENTION

To that end, embodiments of the present invention provide according to a first aspect a method for controlling internet browsing. The method comprises receiving, by a control device such as a mobile phone, via a first communication channel, a web page request from a control agent implemented in a browser. The browser is installed in a computer device such as a PC, a laptop or a tablet, among others, operated by a user. The web request includes a web address requested by the user and user identification information. The control device then requests to a control service, via a second communication channel, a security level of said requested web page including a status of the user and the presence of risks in the requested web page. The control service executes a security check on said requested web page by means of checking whether the requested web page is included in a blacklist or a whitelist and also by checking certain risk control criteria of the requested web page. Finally, in response to receipt a result of said security check from the control service, the control device comprises allowing or denying access to said web page.

In a particular embodiment, the first communication channel is different to the second communication channel. For example, the first communication channel includes a Bluetooth communication and the second communication includes a wireless internet technology such as 3G, 4G or 5G.

In an embodiment, said risk control criteria comprises at least one of the following: checking if content of the requested web page matches a specific blacklist; checking if the web address includes typos; checking if content of the requested web page includes risky operations, such as requesting personal data, password, etc.; checking if content of the requested web page includes unwanted content including violent and/or pornographic content; checking if content of the requested web page includes malicious code and/or checking authenticity of a certificate of the web address.

In an embodiment, the result of the security check is transmitted by the control service to the control device in the form of a message. In case the result of the security check indicates that a potential risk is detected, a level and kind of risk can be further specified in the message.

According to the proposed method, depending on a user configuration and on the level and kind of risk detected, the control device may deny access to the web page, allow access to it or ask for a manual approval of a control user, the latter supervising the control device. In case a manual approval is required, the control user may further ask for a support decision to the control service. The support decision is taken upon the control user receiving one or more of the following data: type of risk including blacklisted content, typo in the web address, risky operation, unwanted content, malicious code, etc.; specific data related to the risk including type of risky operation, sensitive data the web page request, a domain, etc. and/or a screenshot of the requested web page.

In an embodiment, the control device further sends a notification to the control user indicating if the user access to the requested web page has been denied or allowed.

In yet another embodiment, if access to the web page is denied, the control service stores the requested web page in a file thereof.

Embodiments of the present invention also provide according to a second aspect a system for controlling internet browsing. The system includes:
  a browser installed in a computing device (e.g. a computer) operated by a user;
  a control agent (e.g. a browser extension) implemented in said browser;
  a control device (e.g. a mobile phone); and
  a control service (e.g. a remote server such as a cloud computer server, among others).

The control device has a first communication unit to receive, from the control agent, a web page request including a web address requested by the user and user identification information, and a second communication unit to request, to the control service, a security level of said requested web page including a status of the user and the presence of risks in the requested web page, and to receive a response of a security check executed by the control service.

The control device is configured to allow or deny access to the web page taking into account said received response.

According to the proposed system the first and second communication units of the control device can be equal or different. In case of being different, the first communication unit comprises a Bluetooth communication unit and the second communication unit comprises a wireless communication unit including WiFi.

Present invention thus guarantees real time analysis of the operations attempted by the controlled user; maximum distance between controller and controlled devices bounded by technology (reduced security issues and denies by design the use of the controlled device when the control user is away); resiliency by design to Man-in-the-Middle attacks thanks to the use of side channels; resiliency by design to attacks and infection to the controlled device, as the control is executed on a different device and using a different network channel; risk control is performed on a different device (eventually not affected by malware).

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Figure 1:
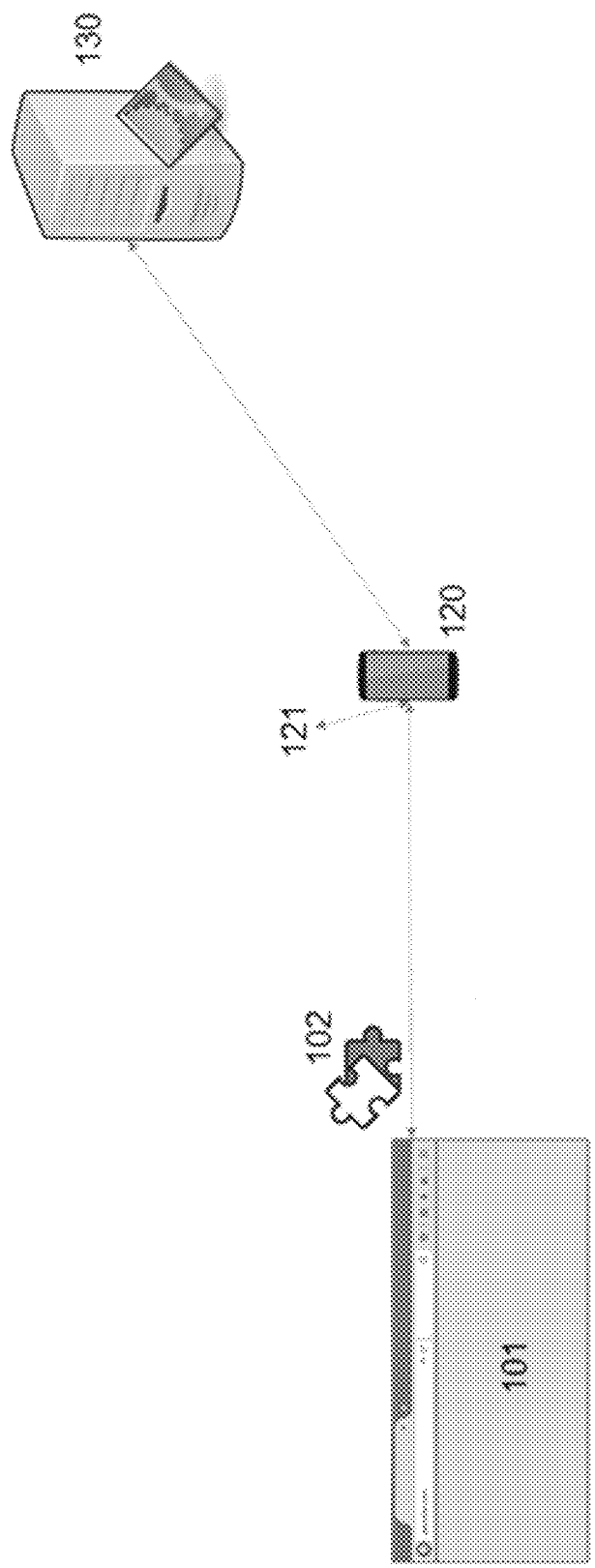
FIG. 1 graphically depicts the system architecture of the present invention according to an embodiment.

FIG. 1 illustrates an embodiment of the architecture of the proposed system. According to this embodiment, a user (not illustrated in the figure) is accessing the Internet 140 through a browser 101, from a generic computer device (e.g. a mobile or fix computer device) and in particular through a browser 101 installed in said computer device, operated by the user. The browser 101 includes a control agent 102, for example implemented as a browser extension, which communicates with a control device 120, such as a phone device, among others. The control device 120 is managed by a control user 121 and can communicate with a control service 130. The control service 130 may be located in the Internet 140 and may be implemented as a service external to the user.

The control device 120 may include a specific software application (e.g., an app) to handle the communication with the control agent 102, the control user 121 and control service 130 and to evaluate the browsing requests. Particularly, the control device 120 interfaces with the control service 130 through specific APIs.

In a particular embodiment, the communication between the control agent 102 and the control device 120 is carried out through a first communication channel, for example via Bluetooth, whereas the communication between the control device 120 and the control service 130 takes place through a second communication channel, different to the first communication channel, in order to avoid security attacks such as Man-in-the-Middle (MitM). A possible choice for the second communication channel may be implemented using 3G/4G/5G connectivity. Likewise, a limited range of connectivity between the computer device (namely the controlled computer device, i.e. the computer device that has the browser 101 installed therein) and the control device 120 allows preventing the usage of the computer device when the control user 121 is away. The use of a different device as control device 120 allows also avoiding eventual malware present on the controlled computer device.

Nevertheless, the use of two different communication channels is not mandatory in the present invention.

According to the proposed invention, when a web page is requested by the user, the control agent 102 forwards the web address (i.e. the URL) together with other needed identification information of the user (e.g. an identifier) to the control device 120, which will reply by allowing or denying the operation. In particular, once the control device 120 receives the web address and the user identification information about a web page request from the control agent 102, it will consult the control service 130 about the security level of the requested content, standing the requesting user setting, and the presence of eventual risks in it.

The control service 130 is at first set for the control user 121 specifying eventual blacklists and/or whitelists, as well as risk control criteria (kind of risks notified, level of risk notification, etc.). Alternatively or complementary, a different setting may be specified for each control user-controlled user pair and is stored in a configuration file in the control service 130.

The risk control criteria that can be checked by the control service 130 may include, but are not limited to:

Content matching a specific blacklist. The black list may be defined by the control user 121 and/or be based on shared blacklists available in specific repositories, including known malicious URLs, etc.

Web address including typos. A possible implementation of this control may include, for instance, the check against a dictionary/repository.

Content including risky operations, e.g., request of sensitive data (account number, personal data, etc.), request of username/password, etc.

Content including unwanted content, e.g., violence, pornography, etc.

Presence of malicious code, e.g., execution of external scripts, coercive redirections, DNS Spoofing, etc.

Non-authenticity of the certificate associated with the web address.

Once the control service 130 replies about a web page request, the control device 120, eventually involving and informing the control user 121, enforces the proper policy to the web page request.

Figure 2:
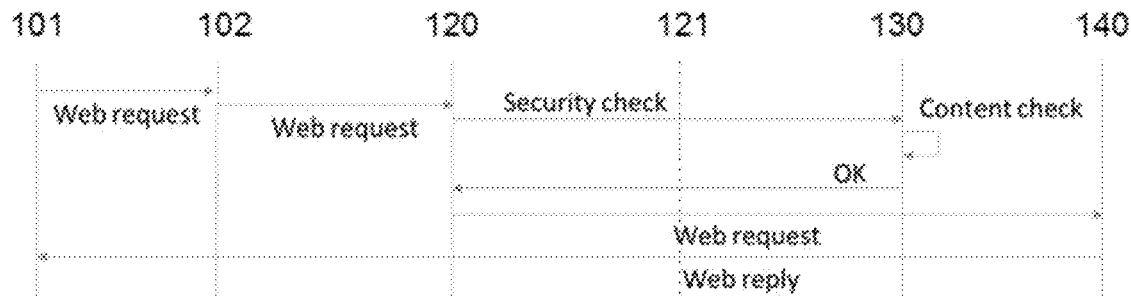
FIG. 2 is a diagram showing that the user attempts to open a webpage, whose content is detected as riskless by the control service.

On the basis of the identified risks and security level set for the user, the following outcomes are possible:

If the control service 130 does not detect potential risks on the basis of the above checks, an OK message is returned to the control device 120, which hence proceeds to forward the original web page request to the Internet 140, which will reply as usual to the controlled user. See FIG. 2 for an example of this kind of transaction.

If the control service 130 detects any potential risk on the basis of the above checks, a notification is sent to the control device 120. A level and kind of risk is specified in the notification message. Depending on the setting for the specific user and on the kind and level of risk identified, the control device 120 blocks the web page request, allows it, or asks for the manual approval of the control user 121 to proceed with the requested content. In the case of manual approval, the control user 121 is informed to support their decision, as specified below.

The specific software application implements the control functionalities and the interfacing with the control agent 102, control user 121 and control service 130. The software application informs the control user 121 of an attempt to access potentially risky content from the controlled browser 101 and supports them in performing an informed choice about allowing or not the requested web page. The information to support the control user 121 may include the risk type (blacklisted content, typo in the web address, risky operation, unwanted content, malicious code, etc.), specific information related to the risk (e.g., if the request includes a risky operation, the control user 121 is informed about the kind of operation, sensitive data the operation requests, the domain requesting such information, etc.), a screenshot/preview of the requested web page (not yet shown to the controlled user), eventually placed side by side with the supposed corresponding genuine content (e.g., in case of typosquatting detection, a preview is shown of the requested page side by side to a preview of the squatted page), a result of previous requests over the same or similar content requests, and possible further information that may be relevant to the control user 121 to take an informed decision. This support information is provided by the control service 130.

Figure 4:
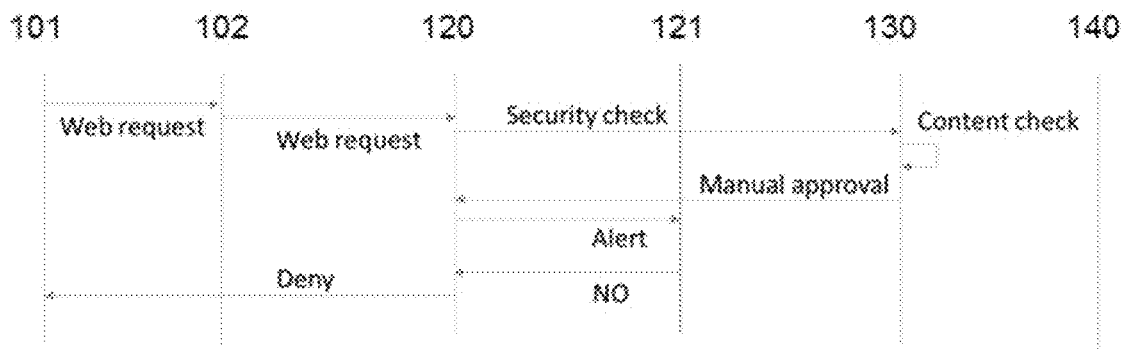
FIG. 4 is a diagram showing that the user attempts to open a webpage, whose content is detected as risky by the control service. The control user, once alerted, denies the user to browse the required content.

The control user 121 takes hence an informed decision about denying/allowing the controlled user to access the requested web page. In case of denying, see FIG. 4, the control agent 102 blocks the request (i.e., does not forward it to the Internet 140) and notifies the controlled user about the denied access to the required content. The action selected by the control user 121 is registered at the control service 130 configuration file, associated to the requested web page, in order to support future choices about similar or same requests.

Figure 3:
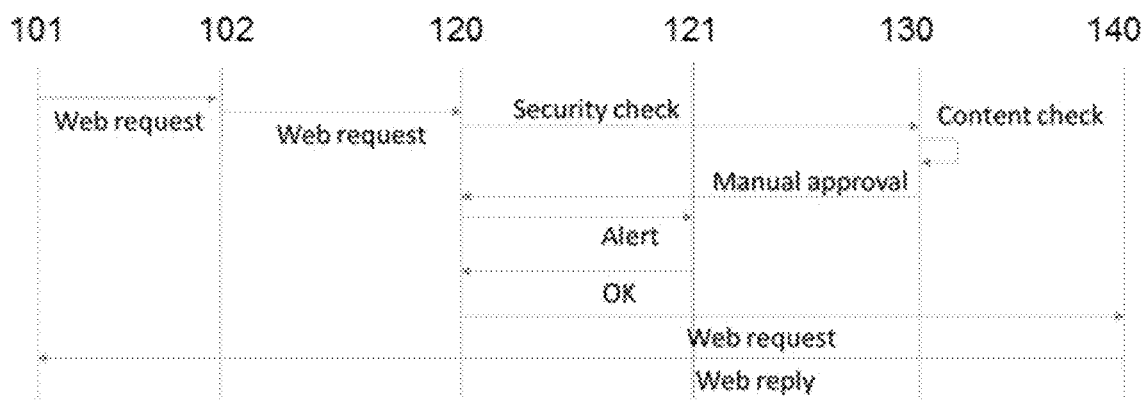
FIG. 3 is a diagram showing that the user attempts to open a webpage, whose content is detected as risky by the control service. The control user, once alerted, allows the user to browse the required content.

In case of allowing, see FIG. 3, the control agent 102 forwards the web page request to the Internet 140 as it originally was, so that the web reply will directly reach the controlled user in a way that is transparent to both the controlled user and the internet server receiving the request. The action selected by the control user 121 is registered at the control service 130 configuration file, associated to the requested web page, in order to support future choices about similar or same requests.

Figure 5:
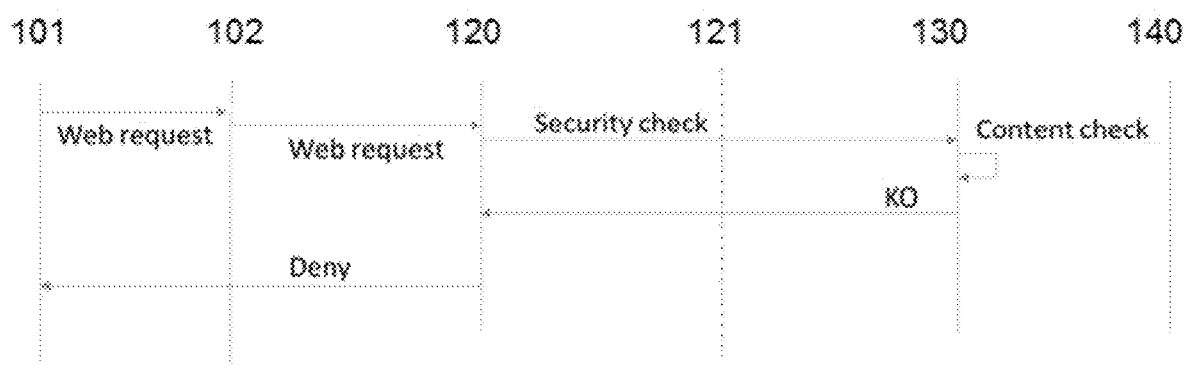
FIG. 5 is a diagram showing that the user attempts to open a webpage, whose content is detected as blacklisted by the control service.

Finally, the control service 130 may identify the requested web page as strictly forbidden, depending on the specified setting (e.g., kind of risk, kind of content, specific web address, etc.). In this case no manual approval is required to the control user 121 and the browsing request of the controlled user is directly denied. Depending on the user setting, the control user 121 may be notified of the request by the controlled user via the control device 120. See FIG. 5 for an example of this kind of transaction.

The user may be the same user controlling the control device 120 (e.g., in case of self-protection from browsing risks), or a different user (e.g., in case of parental control or hierarchical control).

Moreover, the control device 120 can control multiple browsers 101, used by different users or by the same user. In this case, the risk notification sent to the control device 120 will also include an identifier of the corresponding user/browser/controlled computer device.

Different control users 121 may be enabled in the same system and control together the same (set of) users. In this case, a multiple or single authorization may be configured for the system. In the first case, all the control users 121 must authorize the risky web page request before it is accepted, while in the latter case a single control user 121 is notified, and their reply is used to select whether the web page request is forwarded or denied. The specific control user 121 to be notified may be selected on the basis of a defined hierarchy, on the basis of the registration timestamp of the different control users 121 in the system, or on the basis of a load distribution policy (e.g., Round Robin, among others). The control user 121 redundancy allows the system to work as expected (i.e., acceptance/rejection by the control user 121)

also when a control user 121 leaves the system area. On the other hand, a default policy may be set for the cases in which no control user 121 is available in the system area (i.e., reject or allow). In any case, the selected configuration should be configured in the system during its setup.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The scope of the present invention is defined in the following set of claims.

The invention claimed is:

1. A method for controlling internet browsing user security, the method comprising:
   receiving, by a control device, via a first communication channel, a web page request from a control agent implemented in a browser, the browser being installed in a computer device operated by a user and the web page request including a web address requested by the user and user identification information;
   requesting, by said control device, to a control service, via a second communication channel, a security level of said requested web page including a status of the user and a presence of risks in the requested web page;
   executing, by the control service, a security check on said requested web page by means of checking whether the requested web page is included in a blacklist or a whitelist and also by checking certain risk control criteria of the requested web page; and
   in response to receipt a result of said security check from the control service, the control device allowing or denying access to said web page,
   wherein said result of the security check being transmitted by the control service to the control device in a form of a message, wherein based on the result of the security check indicating that a potential risk is detected, a level and a kind of risk is specified in the message, and
   wherein depending on a user configuration and on the level and the kind of risk, the control device denies the access to the web page, allows the access to the web page, or requests for a manual approval of a control user who supervises the control device.

2. The method of claim 1, wherein the first communication channel is different to the second communication channel.

3. The method of claim 2, wherein the first communication channel includes a Bluetooth communication and the second communication includes a wireless internet technology including 3G, 4G or 5G.

4. The method of claim 1, wherein said risk control criteria comprises at least one of the following:
   checking if content of the requested web page matches a specific blacklist;
   checking if the web address includes typos;
   checking if content of the requested web page includes risky operations;
   checking if content of the requested web page includes unwanted content including violent and/or pornographic content;
   checking if content of the requested web page includes malicious code; and/or
   checking authenticity of a certificate of the web address.

5. The method of claim 1, further comprising:
   based on the control device requesting for the wherein if a manual approval is required, receiving, by the control device, the control user further asks a request for a support decision from the control user to the control service, wherein said support decision being taken upon receiving one or more of the following data:
   type of risk including blacklisted content, typo in the web address, risky operation, unwanted content, malicious code;
   specific data related to the risk including type of risky operation, sensitive data the web page request, a domain; and/or
   a screenshot of the requested web page.

6. The method of claim 5, wherein the screenshot of the requested web page is placed side by side with a supposed corresponding genuine web page.

7. The method of claim 1, further comprising sending, by the control device, a notification to the control user about denying/allowing the user to access the requested web page.

8. The method of claim 1, wherein based on the access to said web page being denied, the control service further stores the requested web page in a file thereof.

9. A system for controlling internet browsing user security, comprising:
   a browser installed in a computing device operated by a user;
   a control agent implemented in said browser;
   a control device; and
   a control service;
   wherein the control device has a first communication unit to receive, from the control agent, a web page request including a web address requested by the user and user identification information; and a second communication unit to request, to the control service, a security level of said requested web page including a status of the user and a presence of risks in the requested web page, and to receive a response of a security check executed by the control service,
   wherein the control device being configured to allow or deny access to said requested web page taking into account said received response,
   wherein said result of the security check being transmitted by the control service to the control device in a form of a message, wherein based on the result of the security check indicating that a potential risk is detected, a level and a kind of a risk is specified in the message, and
   wherein depending on a user configuration and on the level and the kind of risk, the control device denies the access to the web page, allows the access to the web page, or requests for a manual approval of a control user who supervises the control device.

10. The system of claim 9, the first communication unit is different to the second communication unit.

11. The system of claim 9, wherein the first communication unit comprises a Bluetooth communication unit and the second communication unit comprises a wireless communication unit including 3G, 4G or 5G.

12. The system of claim 9, wherein the control device is a mobile phone.

* * * * *